United States Patent [19]

Ohyabu et al.

[11] Patent Number: 4,664,669
[45] Date of Patent: May 12, 1987

[54] COMPOSITE HOLLOW FIBER-TYPE SEPARATION MEMBRANES, PROCESSES FOR THE PREPARATION THEREOF AND THEIR USE

[75] Inventors: Shuzo Ohyabu; Syuji Kawai; Takehiko Okamoto, all of Kurashiki; Takao Migaki, Okayama, all of Japan

[73] Assignee: Kuraray Co. Ltd., Kurashiki, Japan

[21] Appl. No.: 584,321

[22] Filed: Feb. 28, 1984

[30] Foreign Application Priority Data

Feb. 28, 1983 [JP] Japan .................................. 58-33304

[51] Int. Cl.$^4$ .............................................. A61F 2/00
[52] U.S. Cl. ........................................ 623/66; 623/11; 604/4; 427/245; 521/51; 521/63; 210/500.2; 210/653; 210/654
[58] Field of Search ............... 3/1; 427/245, 246, 244; 521/51, 63; 210/653, 654, 500.2; 604/4; 623/66, 11

[56] References Cited

U.S. PATENT DOCUMENTS 4,387,024  6/1983  Kurihara .......................... 210/500.2

OTHER PUBLICATIONS

Morgan; *Condensation Polymers: by Interfacial and Solution Methods*, Interscience Pub.; 1965; pp. 305–325 and 370.

Primary Examiner—Richard J. Apley
Assistant Examiner—Gregg Beaucage
Attorney, Agent, or Firm—Kramer and Brufsky

[57] ABSTRACT

A composite hollow fiber type separation membrane which has three layers comprising a selective separation layer, an ultra-microporous layer and a porous layer, said selective separation layer, said ultra-microporous layer, said porous layer being arranged in said order commencing from the inner surface of said hollow fiber membrane;

wherein said selective separation layer is formed on said ultra-microporous layer without penetrating into said ultra-microporous layer and has a non-porous, dense structure, the average thickness of said layer being 0.01–2μ, and the coefficient of variation in thickness thereof being less than or equal to 25%;

wherein said ultra-microporous layer has a surface in which the presence of pores cannot be confirmed by 24,000 × scanning electron microscopy, but which has a fluid permeability at least 10 times that of said selective separation layer, the thickness of said layer being less than or equal to 0.08μ; and wherein said porous layer is a sponge structure comprising pores having a pore diameter of 0.1–1μ except for macro-voids and having a porosity of at least 50%, the thickness of said layer being 10–500μ.

2 Claims, 4 Drawing Figures

COMPOSITE HOLLOW FIBER-TYPE SEPARATION MEMBRANES, PROCESSES FOR THE PREPARATION THEREOF AND THEIR USE

BACKGROUND OF THE INVENTION

1. Field of the Invention

This invention relates to composite hollow fiber type selective separation membranes exhibiting excellent selective separation properties and permeation rate, processes for the preparation thereof, and their use.

2. Description of the Prior Art

In recent years, a number of composite separation membranes have been developed in which a thin film of a polymer having highly selective separation permeability to specific substances is uniformly formed on the surface of a porous body. In addition, many processes have been developed for the purpose of fabricating separation membranes exhibiting excellent selective separation properties and permeability at high flow rates for use as gas separation membranes, such as oxygen enrichment membranes, reverse osmosis membranes, membrane-type artificial lungs, and the like.

Conventional composite membranes exhibit an extremely thick interpenetrating layer because the component responsible for selective separation has penetrated into the minute pores on the surface of the porous support. Because of such a thick interpenetrating layer, the permeation flow rate is extremely low.

For example, in Japanese Patent Application Laid-open No. 86684/1978 (British Patent Application Laid-open No. 7707583), there is disclosed a composite separation membrane for gas separation in which the outer surface of an aromatic polysulfone porous hollow fiber is coated with a thin film of silicone rubber by dipping the porous hollow fiber of the aromatic polysulfone into a solution of a polydimethylsiloxane and a curing agent dissolved in n-heptane and thereafter heating and drying to cure and polymerize the polydimethylsiloxane to convert it to the silicone rubber. However, in this composite separation membrane, the coated silicone rubber penetrates extremely deeply into the minute pores on the porous base surface, and therefore the permeation performance, for example, when used as an oxygen enrichment membrane, is extremely small, e.g., about $10^5$ ml/24 HRS·m$^2$·(kg/cm$^2$), which requires an improvement of the permeation rate by about 100 times in order to be useful in active practice.

Also, since the component responsible for selective separation easily penetrates into the minute pores, it is extremely difficult to completely cover the base surface having the minute pores. As a result, pinholes are developed in the region where the covering is inadequate. Composite separation membranes having such pinholes fail to provide the separation performance otherwise inherent in the selective separation component.

Japanese Patent Publication No. 25451/1981 discloses an improved composite membrane structure having no interpenetrating layer within the minute pores of the porous support. The improved composite membrane is obtained by impregnating the minute pores of the porous support with a liquid to temporarily make the surface of the porous support non-porous and flat, then forming a selective separation layer on its surface, and thereafter removing the liquid impregnated within the minute pores. However, since the surface of the support is inevitably wetted with the impregnating liquid, the adhesion between the porous membrane base and the selective separation layer of the resulting composite membrane is often inadequate and therefore, the membrane is subject to the risk that the selective separation layer can peel off from the base during handling and result in damage to the selective separation layer.

Further, Japanese Patent Publication No. 17589/1973 discloses a two-layered composite selective permeation membrane structure which comprises a uniform porous base and a thin, selectively permeable polymer film formed thereon without an interpenetrating layer by use of a fine powder pore-making agent. However, in this selective permeation membrane, since the pore size of the uniform porous base is equal between the outer surface and the inner surface thereof and is extremly small, e.g., about 100 Å, as is clear from the model in FIG. 2 of Japanese Patent Publication No. 17589/1973, the fluid permeation resistance of the porous base per se is extremely high, and thus even though the fluid permeability of the selectively permeable polymer film per se is adequately high by forming a thin selectively permeable polymer film on the porous base without an interpenetrating layer, the fluid permeability of the two-layered composite membrane as a whole is quite small and also is unsatisfactory in practical use in view of the limited permeation rate.

Composite separation membranes may be roughly classified into two types: one being a film membrane type composite separation membrane is which a selective separation layer is formed on a film membrane type porous support, but such film membrane type composite separation membranes characteristically have a fundamental problem in that it is impossible to have a large effective membrane surface area per unit volume when such membranes are formed into a module, and thus the resulting separation system has to be quite large. A solution to the above problem was the development of composite hollow fiber type separation membranes in which a selective separation layer is formed on the surface of a hollow fiber type membrane porous support, in which case, it is presumed that the effective membrane surface area per unit volume upon module formation can be made larger by 10–100 times, and therefore, it is apparent that this type of membrane provides an excellent advantage enabling the development of a correspondingly small-sized compact separation system.

SUMMARY OF THE INVENTION

Accordingly, an object of the present invention is to provide a highly permeable composite hollow fiber type separation membrane having a very thin selective separation layer, which is free from such defects as pinholes.

Another object of this invention is to provide a composite hollow fiber type separation membrane having a selective separation layer which is not easily breakable and hence easy to handle during use and which also exhibits excellent pressure resistance.

A further object of this invention is to provide a composite hollow fiber type separation membrane useful as an oxygen enrichment membrane and a membrane for an artificial lung.

A still further object of this invention is to provide an artificial lung which comprises a composite hollow fiber type separation membrane.

These as well as other objects are achieved by the present invention which provides a composite hollow fiber type separation membrane having three layers comprising a selective separation layer, an ultra-microporous layer and a porous layer, said selective separation layer, said ultra-microporous layer and said porous layer being arranged in said order commencing from the inner surface of said membrane;

wherein said selective separation layer is formed on said ultra-microporous layer without penetrating into said ultra-microporous layer and said selective separation layer has a non-porous, dense structure, the average thickness of said layer being 0.01–2μ, and the coefficient of variation in thickness thereof being less than or equal to 25%;

wherein said ultra-microporous layer has a surface wherein presence of pores cannot be confirmed by 24,000× scanning electron microscopy, but which has fluid permeability at least 10 times that of said selective separation layer, the thickness of said ultra-microporous layer being less than or equal to 0.08μ; and wherein said porous layer is a sponge structure comprising pores having a pore diameter of 0.1–1μ except for macro-voids and having a porosity greater than or equal to 50%, the thickness of said layer being 10–500μ.

DETAILED DESCRIPTION OF THE INVENTION

The composite hollow fiber type separation membrane of the present invention is a three layered membrane comprising a selective separation layer, an ultra-microporous layer and a porous layer, the selective separation layer, the ultra-microporous layer and the porous layer being arranged in said order commencing from the inner surface of said hollow fiber membrane.

In the composite hollow fiber type separation membrane of this invention, the selective separation layer is formed on the inner surface of the hollow fiber membrane. With the conventional composite hollow fiber type separation membranes, the selective separation layer has generally been formed on the outer surface of said hollow fiber, and when such a composite hollow fiber type separation membrane is actually used, it gives rise to certain disadvantages, for example, because the composite hollow fibers are in contact with each other on the outer surface or for other reasons, the selective separation layer can be peeled off or damaged in various ways.

In the present invention, the above-described disadvantages are not encountered because the selective separation layer is provided on the inner surface of the porous hollow fiber type membrane base.

The three layers which constitute the composite hollow fiber type separation membrane are described respectively in order.

(i) Selective Separation Layer

In the present invention, it is considered important that the selective separation layer has a non-porous, dense structure and that the polymer constituting the selective separation layer does not substantially penetrate into the ultra-microporous layer or further into the porous layer. It is possible to confirm whether or not such an interpenetrating layer is present by observation by scanning electron microscopy. Further, it is necessary that the average thickness of the selective separation layer is in the range of 0.1–2μ, and the coefficient of variation in thickness must be less than or equal to 25%. The average thickness and its coefficient of variation can be determined by observing at least 25 points by scanning electron microscopy. If the thickness exceeds 2μ, the permeation is small which is not considered suitable. On the contrary, if the thickness is less than 0.01μ, the strength of the selective separation layer per se is too small and hence there is a great risk that it can be easily broken and thereby possibly generate pinholes which clearly is undesirable. In order to give a composite hollow fiber type separation membrane having good permeability at a high flow rate and excellent operating properties, the thickness is preferably in the range of 0.05–0.8μ.

Furthermore, in conventional composite hollow fiber type separation membranes, the selective separation layer is generally of a structure having an extremely fluctuating thickness. For example, taking as an example the fluctuation in thickness of a silicone rubber thin film formed on the outer surface of a porous hollow fiber type base obtained according to Example (1) of Japanese Patent Application No. 137282/1981, the fluctuation is extremely large, i.e., the coefficient of variation $=(\sigma/\overline{X})=0.266$, as shown in Table 2 in the Comparative Example described hereinafter.

When such membranes are actually used, for example, as an oxygen enrichment membrane, it is generally necessary to operate under either elevated or reduced pressure, but where the fluctuation in thickness is large, the thinner part receives concentrated stress and easily breaks, thus failing to manifest the intended concentrating performance. Therefore, the fluctuation in thickness must be kept small.

One structural feature of the composite hollow fiber type membrane of this invention is that the fluctuation in thickness of the polymer thin film formed on the inner surface is extremely small, and for that reason, stress is not concentrated on any specific site even when subjected to operation under elevated or reduced pressure. Therefore, the membrane has an excellent form which can completely eliminate the above-described disadvantage that the polymer thin film is broken in operation.

As regards the fluctuation in thickness, this may be easily measured by precisely observing the thicknesses of at least 25 points on the inner surface by scanning electron microscopy. In this invention, the ratio (coefficient of variation) of the standard deviation ($\sigma$) to the average value of the thicknesses at such 25 points ($\overline{X}$) is coefficient of variation $=(\sigma/\overline{X})\leq 0.25$ more preferably, coefficient of variation $=(\sigma/\overline{X})\leq 0.20$, thus the fluctuation in thickness is extremely small.

Various polymers having high selective separation permeability can be employed for the selective separation layer depending upon the particular separation purpose of the composite hollow fiber. For example, polyorganosiloxanes such as polydimethylsiloxane, polydiphenylsiloxane, polymethylphenylsiloxane, and the like, poly-4-methylpentene-1, polytetrafluoroethylene, furfuryl alcohol resins, cellulose acetate, cellulose triacetate, poly-4-vinylpyridine, and the like. Where, for example, the composite hollow fiber type separation membrane is to be particularly employed as an oxygen enrichment membrane or in an artificial lung, a polysiloxane type polymer is the polymer of choice in the sense that its oxygen permeation rate is the highest among all the polymers.

Further, a cross-linked silicone rubber having improved strength properties and solvent resistance provides a great advantage in that the strength properties are improved over a selective separation layer comprising an un-cross linked silicone rubber and therefore such cross-linked layer can be made thinner, which is most suitable as an oxygen enrichment membrane, which is one of the major purposes of this invention.

(ii) Ultra-microporous Layer and Porous Layer

The ultra-micro porous layer adjacent to the selective separation layer is an extremely ultra-microporous structure layer to the extent that the presence of the pores cannot be confirmed by 24,000× scanning electron microscopy. Further, the fluid permeability of the ultra-microporous layer per se must be at least 10 times the fluid permeability of the selective separation layer and its thickness must be less than or equal to $0.08\mu$.

If the pore size on the surface of the ultra-microporous layer is such that the presence of pores can be confirmed by 24,000× scanning electron microscopy, then in practical use, for example, when subjected to an operation under elevated pressure, the extremely thinly formed selective separation layer is broken, and accordingly, the possibility of pinhole generation is increased which clearly is not desirable. Therefore, the pore size on the surface of the ultra-microporous layer is desirably as small as possible to a certain extent, because, if too dense, it in turn, becomes a resistance to fluid permeation which is undesirable. From the same standpoint, the fluid permeability of the ultra-microporous layer per se must be at least 10 times that of the selective separation layer, and its thickness must also be as thin as $0.08\mu$ or less.

Further, the porous layer adjacent to the ultra-microporous layer is composed of a sponge structure made of an integration of pores mainly of $0.1-1\mu$, except for macro-voids, and it is necessary that the porosity is 50% or more and its thickness is $10-500\mu$. Such structural features can be easily confirmed by scanning electron microscopy. If the pores of the sponge structure are smaller than $0.1\mu$, the fluid permeation resistance of the porous layer per se is too large and thus it is undesirable. On the other hand, if the pore size of the sponge structure is larger than $1\mu$, the pressure resistance in practical use is reduced and this layer then fails to act as a support for the composite membrane. The porosity may be determined, for example, by measuring the moisture content, and if it is smaller than 50%, the fluid permeation resistance is too great which is undesirable.

Also with respect to the thickness, if it is less than $10\mu$, the strength of the composite membrane as a whole is small and thus it is impractical. If greater than $500\mu$, the product is too thick a composite hollow fiber and hence it is difficult to fabricate a compact separation membrane module therefrom which is also undesirable.

The material for forming the ultra-microporous layer and the porous layer as the support for the selective separation layer satisfactorily can be those materials having the necessary mechanical strength properties to function as the support, and in this sense, a wide variety of polymer substances can be suitably employed, for example, polyvinyl alcohol, aromatic polysulfones, polyimides, polyether ether ketones, and the like. It is also possible to use two different polymers of the type described above providing they are compatible with each other. In particular, aromatic polysulfones which offer various advantages such as excellent hollow fiber-forming properties and good heat resistance are preferred.

The composite hollow fiber type separation membrane having a three-layered structure according to the present invention is distinguishable from the aforesaid composite two-layered membrane structure disclosed in Japanese Patent Publication No. 17589/1973, since the selective separation layer is formed on the ultra-microporous layer having pores the presence of which cannot be confirmed even by 24,000× scanning electron microscopy. Accordingly, there is no risk that the selective separation layer will be broken and generate pinholes even when operated under elevated pressure. In addition, the thickness of the ultra-microporous layer is extremely thin, i.e., $0.08\mu$ or less, and therefore, the fluid permeation resistance of the ultra-microporous layer per se is quite small.

Further, the pore size in the sponge structure of the supporting porous layer is $0.1-1\mu$ and also the porosity is at least 50%, with the resultant advantage that the fluid permeability of the support porous layer per se is quite large. Therefore, the three-layered structure composite hollow fiber type membrane of the present invention exhibits an excellent fluid permeation rate and practical properties such as pressure resistance and the like are also excellent.

The process for the production of the composite hollow fiber type separation membrane of the present invention is described below.

A feature of the process which forms a part of this invention resides in forming a hollow fiber type membrane initially having a non-porous inner surface. This is achieved by admixing a pore-making polymer which can form minute pores upon appropriate solvent extraction with a matrix polymer and forming an initially non-porous hollow fiber type membrane-shaped support. A polymer having highly selective separation permeability to specific substances is coated, as for example by a solution thereof, on the non-porous inner surface of this non-porous hollow fiber type membrane-shaped product. In this manner, there is, of course, no possibility for interpenetration into the pores because the inner surface is a flat surface lacking pores, and as a result, it is possible to form a selective separation membrane on an extremely ultra-thin membrane, without generating pinholes, which has not previously been achieved by the conventional processes for the fabrication of hollow fiber type composite membranes. Thereafter, by solvent extraction of the pore-making polymer, the hollow fiber type base is made porous, thereby obtaining a composite hollow fiber type separation membrane.

The process for the production of the composite hollow fiber type separation membrane of this invention is now described in order.

(i) Production of Non-porous Hollow Fiber Type Base

In order to obtain the composite hollow fiber type separation membrane of this invention, a matrix polymer and a pore-making polymer are uniformly admixed using a co-solvent having high compatibility with both polymers, then formed into a hollow fiber type membrane-shaped product, and thereafter this co-solvent is removed, whereby a non-porous hollow fiber type membrane-shaped base in which the matrix polymer and the pore-making polymer are extremely uniformly admixed is obtained.

As the polymer for making minute pores, any polymer can be used without any particular restriction as long as it is a polymer having adequately high compatibility with the matrix polymer for forming the porous hollow fiber type membrane-shaped base and capable of being co-molded. In particular, a combination of an aromatic polysulfone and polyvinylpryrrolidone is extremely good in terms of compatibility and hence gives extremely minute pores formed upon the extraction of the polyvinylpyrrolidone. Thus, such polymers are very suitable as the base for the selective separation layer.

In addition to the above, polyethylene glycol, polyacrylic acid, polyacrylamide and the like can also be used as the pore-making polymer.

It is regarded as important in this invention that the compatibility between the pore-making polymer for making minute pores and the matrix polymer for ultimately forming the porous hollow fiber type membrane-shaped base be extremely good, and by this is meant that when the pore-making polymer is ultimately removed by extraction, it is possible to obtain a hollow fiber type base of a porous body made of minute pores.

If the compatibility is not good, the later formed pores of the porous support are too large. In such a case, when the composite separation membrane having the thin film selective separation layer formed on its inner surface is used in practice, for example, in the case of a membrane for gas separation such as an oxygen enrichment membrane, where it is usual to conduct the operation under elevated or reduced pressure, the purposely formed selective separation layer is easily damaged and apt to induce an undesirable situation in that it fails to manifest the naturally expected separation performance. Therefore, in order for the composite hollow fiber type separation membrane (having the extremely thin selective separation layer formed thereon and being free from pinholes so that interpenetration thereof into the minute pores on the surface within the porous base can be prevented) to be used in practice and manifest the expected inherent separation performance without causing any damage of the membrane even when subjected to operation under elevated or reduced pressure, it is essential that the minute pores ultimately formed, for example, by extraction, be sufficiently small in size, and for that purpose, it is important to select, as the pore-making agent, a pore-making polymer having good compatibility with the matrix polymer for forming the porous hollow fiber-type membrane-shaped base.

In this invention, the ratio of the matrix polymer to the pore-making polymer is desirably in the range of 100:25 to 100:200 by weight, and preferably ranges from 100:50 to 100:100. If the ratio of the matrix polymer to the pore-making polymer is greater than 100:25, the number of minute pores obtained by removing the pore-making polymer is too small and therefore, the resulting composite hollow fiber type separation membrane will exhibit too low a permeation rate and hence be unsuitable for practical applications. On the other hand, if the ratio of the matrix polymer to the pore-making polymer is smaller than 100:200, the number of the minute pores obtained by removing the pore-making polymer is extremely high, and therefore, although the composite hollow fiber type separation membrane obtained by using this is adequately high in permeation rate and hence highly practical in this respect, the proportion of pores is extremely high and the relative strength of the porous hollow fiber type membrane-shaped base formed of the matrix polymer is reduced to a level where it fails to satisfactorily act as a strong support for the selective separation layer.

As described hereinabove, the matrix polymer and the pore-making polymer are selected, mixed in a predetermined proportion, and dissolved in a co-solvent for both to prepare a spinning solution. This spinning solution is then spun through an array of annular nozzles into a coagulating bath and coagulated therein forming non-porous hollow fibers.

For example, where polyvinylpyrrolidone or polyethylene glycol is selected as the pore-making polymer, it is quite easily and uniformly admixed with an aromatic polysulfone by selecting e.g., dimethylformamide as the solvent, then this uniform, mutually mixed spinning solution is spun from an array of annular nozzles into a water coagulating bath while injecting water at normal temperature onto the inner surfaces thereof to form hollow fiber-type membrane-shaped products, and the co-solvent, e.g. dimethylformamide, is removed, thereby there is obtained a non-porous hollow fiber type membrane-shaped base in which the polyvinylpyrrolidone or polyethylene glycol as the minute pore-making polymer and the matrix polymer for forming the porous hollow fiber type membrane-shaped base are extremely uniformly admixed.

In this invention, when the spinning solution is spun from the annular nozzles into the coagulating bath and coagulated therein, it is important to rapidly coagulate the inner surface, and thus it is preferred for this purpose to conduct the forming operation while injecting, in particular, water or a coagulating agent mainly comprising water as an inner surface coagulating agent, over the inner surface of the hollow fiber. For example, where an aqueous dimethylformamide solution (containing 50% by weight or more of dimethylformamide) is employed as the inner surface coagulating agent, particularly at a high temperature of 50° C. or above, coagulation on the inner surface is retarded, and the pores on the inner surface obtained after the extraction of the pore-making polymer from the resulting hollow fiber type base are large, and therefore it is difficult to obtain the ultra-microporous layer of this invention.

(ii) Formation of Selective Separation Layer

On the non-porous inner surface of the thus obtained non-porous hollow fiber type membrane-shaped base is formed a thin film of a polymer component having highly selective separation permeability to specific substances.

As the polymer thin film component, it is possible to use various polymers having highly selective separation permeability such as polyorganosiloxanes, poly-4-methylpentene-1, polytetrafluoroethylene, furfuryl alcohol resins, cellulose acetate, cellulose triacetate, poly-4-vinylpyridine, and the like according to the particular separation purpose of the composite hollow fiber, but where the composite hollow fiber type separation membrane is, in particular, an oxygen enrichment membrane, a polyorganosiloxane is most suitable because its oxygen permeation rate is the highest, and further in the sense that the strength properties are even further improved, a silicone rubber obtained by three-dimensionally crosslinking such a chain-like polyorganosiloxane using a crosslinking catalyst is the most desirable. These polymers may be generally used by dissolution thereof in an appropriate solvent. The concentration of the mixed solution used is 1–50% by weight of the polymeric solute, preferably 3–30% by weight. Too dilute a solution is undesirable because it causes pinhole generation; whereas, if the solution is too concentrated, it is also undesirable because the thickness of the resulting film is apt to be too great and a reduction in permeation flow rate is brought about.

In the composite separation membrane of this invention, it is important that the selective separation layer formed on the inner surface of the porous hollow fiber be extremely thin and exhibit a uniform thickness with only extremely small thickness fluctuations.

It has now been surprisingly discovered that by supplying e.g. a polysiloxane-type prepolymer solution containing a crosslinking catalyst onto the inner surface of said hollow fiber type base, allowing it to drain gravitationally to strain off the liquid, then passing a gas over the inner surface of said hollow fiber and thereafter subjecting it to crosslinking treatment to form a three-dimensionally crosslinked silicone rubber thin film on the inner surface of the hollow fiber, said thin film is formed very uniformly such that the coefficient of variation in thickness is extremely small, i.e., coefficient of variation $=(\sigma/\overline{X}) \leq 0.25$, and more desirably, coefficient of variation $=(\sigma/\overline{X}) \leq 0.20$.

Although the mechanism explaining the phenomenon which occurs when the gas is passed over the inner surface of this hollow fiber is not completely understood, it is currently believed to be due to a concentrating effect on the coating solution which forms the selective separation layer by evaporation of the volatile solvent in the coating solution as the gas passes thereover after the coating solution has been applied, which appears to be coupled with a wiping effect created as the coating solution is wiped away along with the passage of the gas.

However, the formation of such a uniform thin film with only extremely small fluctuations in thickness has not heretofore been attainable by conventional techniques, and this has been made possible for the first time in accordance with the process of the present invention and, in particular, by the discovery of the step of passing a gas over the coating solution after said solution has been applied to the inner surface of the hollow fiber. Further, it has been found more effective to repeatedly conduct (two or more times) the steps of applying the coating solution over the inner surface of the hollow fiber and subsequently passing the gas thereover, in order to obtain a selective separation layer having particularly small fluctuations in thickness.

Furthermore, when the coating solution is applied over the inner surface of the hollow fiber, it has been found advantageous to install a wire screen of about 100 mesh or so in the vicinity of the terminal portion of the inlet for the coating solution to the hollow fiber. After passage of the coating solution, the coating solution is retained in a large amount in the minute network of said wire screen and thereafter, when the gas is again passed, the coating solution retained in the network of the wire screen in the vicinity of the terminal portion of the inlet for the coating solution to the hollow fiber is supplied to the inner surface of the hollow fiber while being efficiently concentrated. Thus, when the above-described steps of passing the coating solution and subsequently passing the gas are repeatedly conducted, the number of repetitions can be efficiently reduced. Of course, the above-described use of a wire screen of 100 mesh or so is merely an illustration, and any kind of a liquid reservoir which can retain the coating solution in the neighborhood of the terminal portion of the inlet for the coating solution to the hollow fiber may be employed.

The gas to be used is advantageously air which may be suitably passed at a linear velocity of 0.1–50 m/sec for a period of 1 second or longer per pass.

In the case of a slow velocity of less than 0.1 m/sec, the reduction in thickness fluctuation is small. On the other hand, if an extremely high velocity of greater than 50 m/sec is employed, the mixed solution supplied onto the inner surface is blown away bringing about undesirable fluctuations in thickness.

The above-described coating operation for forming the selective separation layer may be conducted after module formation by bundling the hollow fibers, or may be conducted on the hollow fibers before such module formation.

(iii) Extraction of Pore-Making Polymer

After the selective separation layer has been formed as described above, the outer surface of the hollow fiber is brought into contact with e.g. water or ethanol, methanol or the like, thereby extracting and removing the pore-making polymer, such as polyvinylpyrrolidone or polyethylene glycol.

The method for extraction and removal is most simply extraction with water, and in this sense, the use of a water-soluble polymer such as polyvinylpyrrolidone, polyethylene glycol, and the like as the pore-making polymer is convenient because extraction with water is possible. However, if it is attempted to extract in a shorter time period, it is generally necessary to extract with hot water, such as boiling water, and therefore there is a risk that the purposely formed selective separation layer can be damaged or peeled off due to water convection during extraction. In order to avoid this risk, it is desirable to employ e.g., ethanol or methanol having a satisfactory extraction rate at a relatively low temperature such as 60° C. as an extracting solvent. Of course, when selecting the extracting solvent, it is necessary to select an extracting solvent which does not dissolve the matrix polymer and the selective separation layer portion of the inner surface.

As a result, there is formed a porous hollow fiber type base which comprises an ultra-microporous layer having a permeability at least 10 times that of the selective separation layer, dense to such extent that the presence of the pores cannot be confirmed by 24,000× scanning electron microscopy and having a thickness less than or equal to $0.08\mu$, and an adjacent porous layer comprising a sponge structure having a pore diameter of $0.1–1\mu$ except for macro-voids and having a thickness of 10–500μ.

The use of the composite hollow fiber type separation membranes obtained by this invention is varied; they may, of course, be used as membranes for various gas separations, such as oxygen enrichment membranes, and the like, according to the separation performance of the particular polymer component forming the selective separation layer, and also they may be used in a wide range of separation applications, such as reverse osmosis membranes and the like.

The membranes of the present invention are particularly useful in the manufacture of membrane type artificial lungs. It has now been discovered to be essential that such artificial lungs be formed from composite hollow fibers having three layers comprising a selective separation layer exhibiting excellent oxygen gas permeation performance and carbon dioxide gas permeation performance, an ultra-microporous layer and a porous layer in that order commencing from the inner surface of said hollow fibers. In particular, it has been recognized that the presence of an ultra-microporous layer having a fluid permeability which is at least 10 times that of the selective separation layer although the presence of the pores cannot be confirmed by 24,000× scanning electron microscopy and a thickness less than or equal to 0.08μ is an essential requirement for obtaining an excellent membrane type artificial lung.

In other words, since the ultra-microporous layer is a dense structure and hence an extremely flat surface without unevenness when observed microscopically, although its surface is ultra-microporous to such extent that the presence of the pores cannot be confirmed by 24,000× scanning electron microscopy, the selective separation layer formed thereon can be made sufficiently thin and also the fluctuation in thickness can be kept small.

With the conventional composite hollow fiber type membrane type artificial lung lacking the presence of the aforesaid ultra-microporous layer, i.e., comprising only two layers—a selective separation layer and a porous layer (cf. Japanese Patent Application Laid-open Nos. 15483/1977 and 160098/1979), since the surface of the porous layer on which the selective separation layer is to be formed is inevitably an uneven surface which is not extremely flat when observed microscopically, the selective separation layer formed thereon is apt to be a thick layer exhibiting significant fluctuations in thickness.

In the composite hollow fiber type separation membrane used in the artificial lung, the selective separation layer can satisfactorily be a non-porous dense layer having an average thickness of 0.01–5μ, and the strict requirements imposed when such membranes are used as an oxygen enrichment membrane are not necessary. However, if the thickness is less than 0.01μ, the selective separation layer is too thin and easily breakable and thus poor from a practical point of view. In the case of thicknesses greater than 5μ, the gas exchange rate is too slow to be practical. Further, if there is any fluctuation in the thickness of the selective separation layer, stress tends to concentrate on the thinner portions, which tends to cause damage to the selective separation layer. Therefore, it is preferred that the fluctuation in thickness be minimized, and the above-described coefficient of variation is desirably 25% or less. In particular, where a membrane type artificial lung having a high gas exchange rate is required, the selective separation layer is desirably formed in such a way that the polymer component constituting the selective separation layer does not penetrate into the ultra-microporous layer. In this manner, the thickness of the selective separation layer can be even thinner, and therefore it is possible to obtain an excellent membrane type artificial lung exhibiting an enhanced gas exchange rate.

The ultra-microporous layer and the porous layer of the composite hollow fiber type membrane type artificial lung constructed by using the composite hollow fiber type membrane having a three-layered structure is preferably an aromatic polysulfone for the same reasons as those described hereinabove. Also, the material for the selective separation layer is preferably a polyorganosiloxane type polymer which is excellent in blood compatibility and also in both oxygen permeation rate and carbon dioxide permeation rate. A polyorganosiloxane type polymer which has been three-dimensionally cross-linked is most preferred because of its better strength.

Further, by bundling a number of composite hollow fiber type membranes having the three-layered structure of this invention, it is possible to easily fabricate, for example, a cylindrical membrane type artificial lung module in the conventional manner, and furthermore, a membrane type artificial lung system incorporating said cylindrical, membrane type artificial lung module may be constructed.

An artificial lung is employed as follows: blood taken from a vein of a patient, once pooled in a venous reservoir and passed through a multi-tubular heat exchanger, by e.g. a blood roller pump, to adjust the temperature, is sent onto the inner surface of the hollow fibers of the membrane type artificial lung module to permit gas exchange (oxygen gas/carbon dioxide gas) with oxygen gas brought into contact with the outer surface of the hollow fibers to transfer a predetermined amount of oxygen and concentrate it in the blood, which is then sent back through an artery of the patient using a blood pass line, thereby functioning as an artificial lung. In addition to the artificial lung, the above-described instruments are also installed to complete an artificial lung system.

Further, a composite type module in which a multi-tubular heat exchanger is also installed at the venous blood inlet of the cylindrical membrane type artificial lung module is simpler and more practical. Furthermore, auxiliary equipment other than the above, for example, a recycling line and the like may be installed as necessary.

This invention is more particularly described by the following examples, which are merely illustrative of this invention, and should not be construed as imposing any restrictions on either the spirit or scope thereof.

EXAMPLE 1

100 Parts by weight of an aromatic polysulfone (trade name: Udel Polysulfone P-1700, produced by Union Carbide Corp., Danbury, Ct) and 100 parts by weight of polyvinylpyrrolidone were dissolved and mixed in 500 parts by weight of a co-solvent therefor, dimethylformamide, to prepare a spinning solution. This spinning solution was spun from an annular nozzle while supplying water to the hollow part to mold it into a hollow fiber form. The hollow fiber thus spun was passed through a water bath and at the same time the dimethylformamide was removed. Thereafter, the fiber was dried to finally obtain a non-porous hollow fiber type membrane base of 800μ in outer diameter, 500μ in inner diameter and 150μ in film thickness, in which 100 parts by weight of the aromatic polysulfone and 100 parts by weight of the polyvinylpyrrolidone were extremely uniformly admixed.

On the other hand, a cold curing silicone rubber (trade name: Sylpot 184 W/C, produced by Dow Corning Corp., Midland, Mich.) and 1/10 the amount thereof of a curing catalyst were dissolved in n-pentane to prepare a 10% by weight silicone solution. The thus prepared silicone solution was applied over the inner surface of each hollow fiber wherein the hollow fibers were in the form of a bundle of 200 fibers of the above-described non-porous hollow fiber type membrane bases) at an application rate of 30 ml/min for about 3 minutes. Thereafter, the silicone solution was drained off by gravity, and then air was passed at a linear velocity of 15 m/sec for about one minute. The solution application—air passage steps were repeated 10 times. Thereafter, crosslinking of the silicone rubber was effected at 100° C. for an hour followed by dipping in ethanol at 60° C. for 16 hours, to achieve the extraction removal of the polyvinylpyrrolidone.

By the above-described procedures, there was finally obtained a composite hollow fiber type separation membrane which comprised a porous hollow fiber type membrane-shaped base having an ultra-microporous layer comprised of the aromatic polysulfone, an adjacent porous layer, and a selective separation layer comprised of a silicone rubber thin film on the inner surface of the base, said thin film being such that it did not substantially penetrate into the ultra-microporous layer on the inner surface and it exhibited extremely small fluctuations in thickness both in the circumferential direction of said hollow fiber inner surface and in the fiber axis direction.

When 25 points on the inner surface of the selective separation layer were precisely observed by scanning electron microscopy, the thickness of the silicone rubber thin film formed on the inner surface was as shown in Table 1.

In the composite membrane thus obtained, the average thickness of the thin film-shaped selective separation layer was $\overline{X}=3300$ Å, and the standard deviation was $$\sigma = \sqrt{\frac{\sum_{i=1}^{25}(\overline{X}-X_i)^2}{25-1}} = 576$$

and accordingly, the ratio (coefficient of variation) of the standard deviation ($\sigma$) to the average thickness ($\overline{X}$) was a coefficient of variation=$(\sigma/\overline{X})$=0.175. Thus, the obtained structure exhibited only a very small fluctuation in thickness, and it was clearly observed that the selective separation layer of the silicone rubber thin film did not substantially penetrate into the ultra-microporous layer on the inner surface of the hollow fiber base.

TABLE 1

| i | Thickness $(X_i)$ (Å) | i | Thickness $(X_i)$ (Å) | i | Thickness $(X_i)$ (Å) |
|---|---|---|---|---|---|
| 1 | 3200 | 11 | 3700 | 21 | 3400 |
| 2 | 4700 | 12 | 4100 | 22 | 3300 |
| 3 | 3400 | 13 | 3100 | 23 | 3600 |
| 4 | 3300 | 14 | 1500 | 24 | 3400 |
| 5 | 2600 | 15 | 3900 | 25 | 3500 |
| 6 | 3800 | 16 | 3300 | | |
| 7 | 3000 | 17 | 2900 | | |
| 8 | 3500 | 18 | 3600 | | |
| 9 | 3400 | 19 | 3300 | | |
| 10 | 2800 | 20 | 3200 | | |

Then, the silicone rubber thin film was carefully peeled off from the inner surface of the obtained composite hollow fiber type membrane so that the ultra-microporous layer was not damaged, and the exposed ultra-microporous layer was observed by 24,000× scanning electron microscopy. The obtained photomicrograph is shown in FIG. 3; the ultra-microporous layer had a dense structure to such extent that the pores could not be confirmed at a magnification of 24,000×, and the thickness of said layer was about 0.05μ as measured based on the same photomicrograph.

Figure 1:
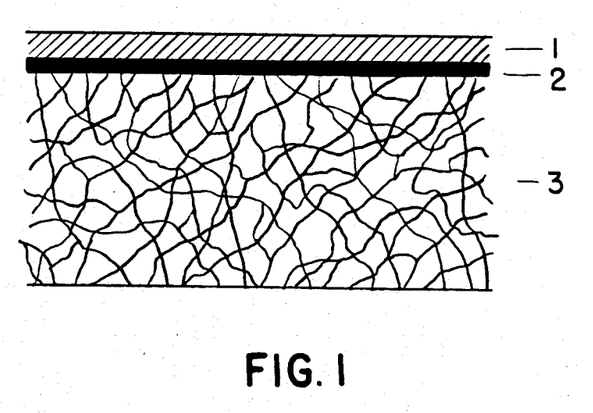
FIG. 1 is a schematic representation of a composite hollow fiber type separation membrane obtained by this invention wherein 1 stands for a selective separation layer, 2 for an ultra-microporous layer, and 3 for a porous layer.
Figure 2:
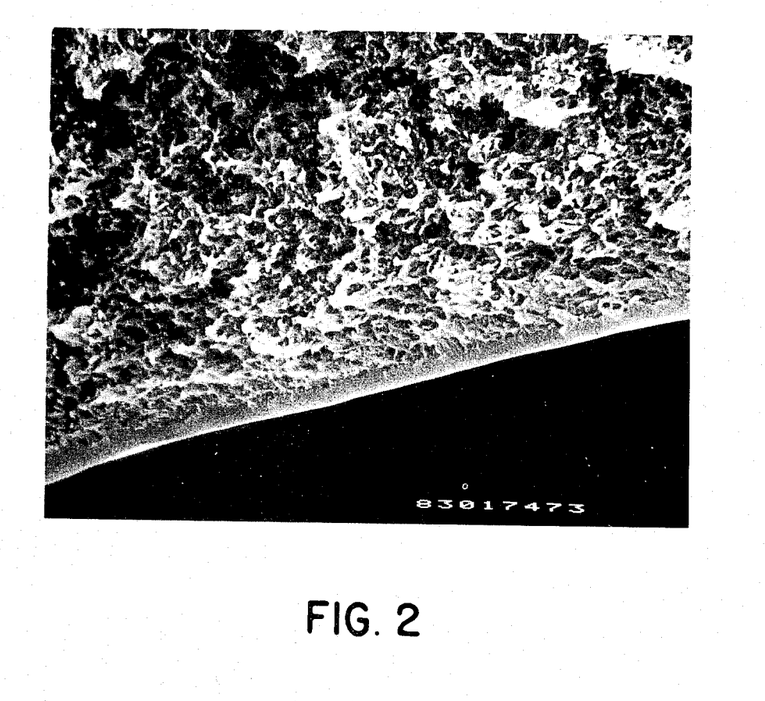
FIG. 2 is a 24,000× scanning electron photomicrograph showing an embodiment of the composite hollow fiber type separation membrane obtained by this invention which has a crosslinked silicone rubber thin film selective separation layer, an aromatic polysulfone ultra-microporous layer, and an aromatic polysulfone porous layer.
Figure 3:
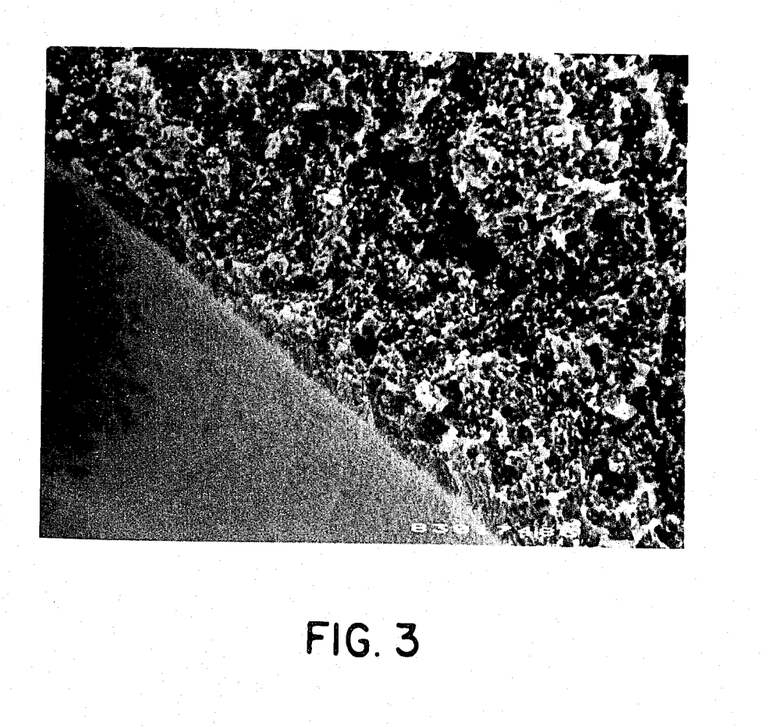
FIG. 3 is a 24,000× scanning electron photomicrograph showing an embodiment of the ultra-microporous layer obtained when the selective separation layer is peeled off from the inner surface of the composite hollow fiber type separation membrane obtained by this invention.
Figure 4:
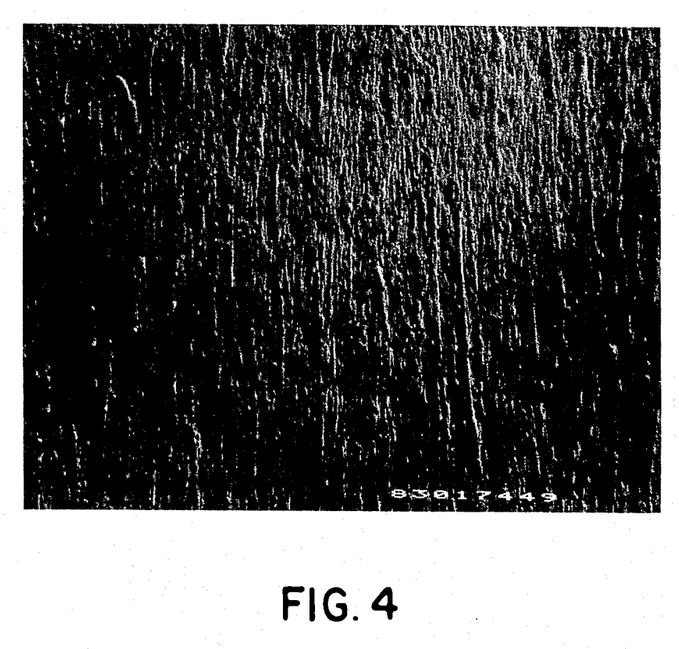
FIG. 4 is a 24,000× scanning electron photomicrograph of the ultra-microporous layer of FIG. 3, as observed horizontarily.

In FIG. 3, the condition of the porous layer is also shown, and it is evident that this is of a sponge structure comprising an integrated body of pores of 0.1-1μ in pore diameter. The porosity of this porous layer was measured to be 76% from its moisture content.

The permeation performance when the obtained composite hollow fiber type separation membrane is used as an oxygen enrichment membrane is described in detail hereinbelow.

Air was supplied at 7 kg/cm² gauge pressure onto the inner surface of the above-described composite hollow fiber type separation membrane containing the selective separation layer of the silicone rubber thin film (of 3300 Å average thickness), thereby effecting the selective separation of oxygen and nitrogen in air. The composition of the permeated gas was analyzed by gas chromatography and found to be oxygen=ca. 35 vol% and nitrogen=ca. 65 vol%. This degree of oxygen concentration was in perfect agreement with the degree of oxygen concentration when air pressurized to 7 kg/cm² gauge pressure was supplied to a silicone rubber thin film having no pinholes. Accordingly, it is apparent that the silicone rubber thin film formed on the inner surface of the porous hollow fiber membrane base comprising the aromatic polysulfone neither causes any defects such as pinholes nor causes any damage to the membrane even under pressure, and satisfactorily manifests the inherent separation performance. Further, the permeation flow rate of the oxygen enriched atmosphere having an oxygen concentration of about 35 vol% was excellent and useful from a practical point of view being about $2 \times 10^8$ ml/24 HRS·m²·(kg/cm²). Therefore, the thus obtained composite hollow fiber type separation membrane is excellent as an oxygen enrichment membrane.

Further, in regard to the flow rate obtained through the structure obtained by peeling off the silicone rubber thin film from the inner surface, the air permeation flow rate was $3 \times 10^{11}$ ml/24 HRS·m²·(kg/cm²), which was 1500 times the permeation flow rate of the aforesaid oxygen enriched atmosphere.

For reference, in regard to the air permeability of the hollow fiber type base composed of two layers, i.e. the ultra-microporous layer and the porous layer from the surface of which the silicone rubber thin film had been peeled off, the porous layer was composed of a sponge structure of 0.1-1μ in pore diameter and the porosity was as large as 76%. In other words, the air permeation resistance was extremely small and thus negligible as compared with the air permeation resistance of the ultra-microporous layer. Therefore, the aforesaid air permeation flow rate of $3 \times 10^{11}$ ml/24 HRS·m$^2$·(kg/cm$^2$) is the air permeation flow rate governed by the ultra-microporous layer.

COMPARATIVE EXAMPLE 1

Employing the same procedures as those in Example 1, a non-porous hollow fiber type membrane-shaped base of 800$\mu$ in outer diameter, 500$\mu$ in inner diameter and 150$\mu$ in film thickness was prepared in which 100 parts by weight of the aromatic polysulfone and 100 parts by weight of the polyvinylpyrrolidone were uniformly admixed. The membrane was dipped in ethanol at 60° C. for 16 hours to effect the extraction removal of the polyvinylpyrrolidone, thereby forming a porous hollow fiber type membrane-shaped base comprising the aromatic polysulfone.

When the inner surface of membrane was observed by 24,000× scanning electron microscopy, although an ultra-microporous layer of 0.05$\mu$ was observed, the presence of the pores was not confirmed. Further, a porous layer adjacent thereto was also clearly observed, and this was of substantially the same structure as that described in Example 1 above.

200 Fibers of such porous hollow fiber type bases were bundled, and to the inner surface of each of such hollow fibers was applied a 10% by weight silicone solution prepared in the same manner as in Example 1 at an application rate of about 30 ml/min for about 3 minutes, then the silicone solution was drained off by gravity, and air was passed thereover at a linear velocity of about 15 m/sec for about one minute. This coating application—air passage sequence was repeated 10 times. Thereafter, crosslinking of the silicone rubber was effected at 100° C. for an hour to obtain a composite hollow fiber type separation membrane having no pinholes.

Air, pressurized to 7 kg/cm$^2$ gauge pressure, was supplied to the inner surface of this membrane to effect separation. While the composition of the permeated gas was measured as oxygen=ca. 35 vol% and nitrogen=ca. 65 vol%, the flow rate of the permeated gas was extremely slow at about $10^6$ ml/24 HRS·m$^2$·(kg/cm$^2$) which is hardly usable in practice.

When the cross section of this hollow fiber type composition membrane was observed by scanning electron microscopy, it was clearly observed that an extremely thick silicone rubber interpenetrating layer having a thickness of about 4$\mu$ had been formed on the inner surface of the porous hollow fiber type base deep into the ultra-microporous layer and the porous layer. Because of the formation of this interpenetrating layer of the silicone rubber of such large thickness as 4$\mu$ into the porous portion of the membrane, the flow rate of the permeated gas obtained as above was quite small, thereby inevitably resulting in a composite hollow fiber type membrane having very poor properties from a practical point of view.

On the other hand, since it was believed appropriate to reduce the thickness of the silicone rubber interpenetrating layer in order to increase the flow rate of the permeated gas and hence it was believed appropriate to reduce the concentration of the silicone solution for such a purpose, the same experiment as the above was conducted using a 1% by weight silicone solution, i.e. the concentration thereof was less by one order of magnitude than previously employed. As a result, although the flow rate of the permeated gas was quite large at about $10^9$ ml/24 HRS·m$^2$·(kg/cm$^2$), when the composition thereof was analyzed by gas chromatography, it was found that no concentration had taken place, i.e. oxygen=ca. 21 vol% and nitrogen—ca. 79 vol%. In other words, in the composite hollow fiber type separation membrane thus produced, the silicone rubber thin film formed on the inner surface of the porous hollow fiber type base had an extremely great number of pinholes and thus could not effect the inherent separation performance.

COMPARATIVE EXAMPLE 2

A non-porous hollow fiber type membrane base of 640$\mu$ in outer diameter, 320$\mu$ in inner diameter and 160$\mu$ in film thickness, in which 100 parts by weight of the aromatic polysulfone and 100 parts by weight of the polyvinylpyrrolidone were uniformly admixed was obtained in the same manner as in Example 1.

A cold curing silicone rubber (trade name: Sylpot 184 W/C, produced by Dow Corning Corp., Midland, Mich.) and 1/10 the amount thereof of a curing catalyst were dissolved in n-pentane to prepare a 30% by weight silicone solution.

The aforesaid non-porous hollow fiber-shaped membrane base was dipped in the thus prepared 30% by weight silicone solution for 10 minutes by binding its terminal portions so that the silicone solution would not penetrate inside the hollow fiber, and dried in hot air at 100° C. for 60 minutes, thereby curing and polymerizing Sylpot 184 W/C on the outer surface of the non-porous hollow fiber. Thereafter, the membrane was again dipped in the same fashion in the 30% by weight silicone solution, and dried in hot air at 100° C. for 60 minutes to form a pinhole-free silicone rubber ultra-thin film firmly combined with the aromatic polysulfone base on the outer surface of the non-porous hollow fiber. Then, ethanol at 60° C. was passed through the inside of the thus obtained non-porous composite hollow fiber to extract and remove the polyvinylpyrrolidone from the inner surface. There was thus finally obtained a hollow fiber-shaped composite separation membrane composed of the porous hollow fiber-shaped membrane base composed of the aromatic polysulfone and the selective separation layer of the silicone rubber thin film formed on the outer surface of the base. As regards the thickness of the silicone rubber thin film of this membrane, the thicknesses at 25 points were precisely observed by scanning electron microscopy to obtain the results shown in Table 2.

$$\text{Average Thickness: } \overline{X} = \frac{\sum_{i=1}^{25}(X_i)}{25} = 5100 \text{ Å,}$$

$$\text{Standard Deviation: } = \sqrt{\frac{\sum_{i=1}^{25}(\overline{X} - X_i)^2}{25 - 1}} = 1355,$$

and accordingly, the ratio (coefficient of variation) of the standard deviation ($\sigma$) to the average thickness ($\overline{X}$) was extremely large: coefficient of variation=($\sigma$/e,ovs/X/ )=0.266, and thus the obtained silicone rubber thin film exhibited a great fluctuation in thickness.

TABLE 2

| i | Thickness (X$_i$) (Å) | i | Thickness (X$_i$) (Å) | i | Thickness (X$_i$) (Å) |
|---|---|---|---|---|---|
| 1 | 1800 | 11 | 7100 | 21 | 4100 |
| 2 | 4800 | 12 | 3100 | 22 | 5300 |
| 3 | 6100 | 13 | 4700 | 23 | 6300 |
| 4 | 5200 | 14 | 5200 | 24 | 4300 |
| 5 | 8100 | 15 | 5800 | 25 | 5000 |
| 6 | 3900 | 16 | 3800 | | |
| 7 | 5600 | 17 | 4600 | | |
| 8 | 6600 | 18 | 5100 | | |
| 9 | 3600 | 19 | 6800 | | |
| 10 | 5500 | 20 | 4800 | | |

EXAMPLE 2

150 Fibers of the composite hollow fiber type separation membrane obtained in Example 1, of 800μ in outer diameter, 500μ in inner diameter and 150μ in film thickness, having a silicone rubber thin film of 3300 Å on the average on the inner surface were bundled in parallel. This bundle was placed within a transparent, cylindrical polycarbonate container having an inlet and an outlet for oxygen gas, then both ends of the composite hollow fiber bundle and the end parts of the polycarbonate cylindrical container were bonded and molded using a resin so that there was no leakage of gas. Both end portions of the composite hollow fiber bundle were cut to provide uniform access to the interior of each hollow fiber. Thus, an extremely compact composite hollow fiber type artificial lung having an effective length of 10 cm and an effective inner surface area of 240 cm$^2$ was fabricated.

Fresh bovine blood was passed through the inner surface of the hollow fiber of such a composite hollow fiber type artificial lung at a flow rate of 230 ml/min; while oxygen gas, introduced from the oxygen gas inlet of the polycarbonate container, was passed over the outer surface of the hollow fibers at a flow rate of 230 ml/min, whereby oxygen gas exchange was effected via the composite hollow fiber type membrane.

The gas exchange time was 24 hours. The oxygen gas transfer into the bovine blood was measured as 62 ml/min-m$^2$ at a time 15 minutes after the start of the gas exchange and 58 ml/mil-m$^2$, 24 hours later, and thus an extremely great oxygen gas permeation rate was stably maintained for a prolonged time.

Further, there was no problem that the plasma components or water content in the blood exuded out of the outer surface, and even at the time of blood returning, no clogging of the hollow fibers were observed. The degree of hemolysis of the oxygen-added blood was low, and also the generation of thrombi was at a satisfactorily low level, and thus the composite hollow fiber type artificial lung having a silicone rubber thin film on the inner surface according to the present invention provided an excellent artificial lung which can successfully withstand continued use for a prolonged time.

What is claimed is:

1. A composite hollow fiber type gas separation membrane consisting essentially of a selective separation layer comprising a three dimensionally cross-linked polyorganosiloxane polymer, an ultra-microporous layer and a porous layer, said selective separation layer, said ultra-microporous layer and said porous layer being arranged in said order commencing from the inner surface of said hollow fiber membrane;
   wherein said selective separation layer does not penetrate into said ultra-microporous layer, and has a non-porous, dense structure, the average thickness of said layer being 0.01–2μ, and the coefficient of variation in thickness thereof being less than or equal to 25%;
   wherein said ultra-microporous layer has a surface in which the presence of pores cannot be confirmed by 24,000× scanning electron microscopy, but which has fluid permeability at least 10 times that of said selective separation layer, the thickness of said layer being less than or equal to 0.08μ; and
   wherein said porous layer is a sponge structure comprising pores having a pore diameter of 0.1–1μ except for micro-voids and having a porosity of at least 50%, the thickness of said layer being 10–500μ.

2. The composite hollow fiber type separation membrane according to claim 1 in which said ultra-microporous layer and said porous layer are layers comprising an aromatic polysulfone.

* * * * *